(12) United States Patent
Ramsey et al.

(10) Patent No.: US 12,738,792 B2
(45) Date of Patent: Sep. 15, 2026

(54) EMOTOR BUSBAR WITH FASTENED FIXATION POINT

(71) Applicant: Schaeffler Technologies AG & Co. KG, Herzogenaurach (DE)

(72) Inventors: John Ramsey, Mansfield, OH (US); Vishal Jadhav, Kent, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 245 days.

(21) Appl. No.: 18/753,213

(22) Filed: Jun. 25, 2024

(65) Prior Publication Data

US 2025/0392182 A1 Dec. 25, 2025

(51) Int. Cl.
*H02K 3/50* (2006.01)
*H02K 1/16* (2006.01)
*H02K 3/28* (2006.01)

(52) U.S. Cl.
CPC ................ *H02K 3/50* (2013.01); *H02K 1/16* (2013.01); *H02K 3/28* (2013.01); *H02K 2203/09* (2013.01)

(58) Field of Classification Search
CPC .. H02K 3/50; H02K 1/16; H02K 3/28; H02K 2203/09
USPC ........................................................... 310/71
See application file for complete search history.

(56) References Cited

U.S. PATENT DOCUMENTS

2013/0264899 A1* 10/2013 Goto ........................ H02K 3/50 310/71
2014/0232223 A1* 8/2014 Takasaki .................. H02K 3/28 310/71
2021/0194308 A1* 6/2021 Jones ....................... H02K 3/50

FOREIGN PATENT DOCUMENTS

WO WO-2020225248 A1 * 11/2020 ............. H02K 5/225

* cited by examiner

*Primary Examiner* — Jose A Gonzalez Quinones
(74) *Attorney, Agent, or Firm* — Price Heneveld LLP

(57) ABSTRACT

A stator assembly for an electric motor includes a stator carrier that extends along an axis between a first side and a second side and defines an opening. A tab is located on one of the first side or the second side, the tab defines a first connection aperture. A plurality of windings are located in the opening and at least one bus bar is in conductive communication with the plurality of windings. A bus bar carrier includes a body that supports the at least one bus bar. The body includes a projection extending towards the tab that defines a second connection aperture. A connector extends through the first and second connection apertures to attach the projection to the tab. The connector is selected from a group comprising a rivet, a bolt, or a welded plastic piece.

20 Claims, 8 Drawing Sheets

EMOTOR BUSBAR WITH FASTENED FIXATION POINT

FIELD OF THE DISCLOSURE

The present disclosure generally relates to a stator assembly that includes a bus bar and a plurality of windings coupled to a stator carrier and, more particularly, a system for connecting the bus bar to the stator carrier.

BACKGROUND OF THE DISCLOSURE

Electric motors typically include a housing with a rotor and a stator located in the housing. The stator typically includes a bus bar a plurality of windings coupled to a stator carrier and, during usage, relative movements, such as vibration, can cause the bus bar to become dislodged or loose from the stator carrier.

SUMMARY OF THE DISCLOSURE

According to a first aspect of the present disclosure, a stator assembly for an electric motor includes a stator carrier that extends along an axis between a first side and a second side and defines an opening. A tab is located on one of the first side or the second side, the tab defines a first connection aperture. A plurality of windings are located in the opening and at least one bus bar is in conductive communication with the plurality of windings. A bus bar carrier includes a body that supports the at least one bus bar. The body includes a projection extending towards the tab that defines a second connection aperture. A connector extends through the first and second connection apertures to attach the projection to the tab. The connector is selected from a group comprising a rivet, a bolt, or a welded plastic piece.

Embodiments of the first aspect of the disclosure can include any one or a combination of the following features:

- the first connection aperture defines internal threads and the connector includes the bolt.
- the bolt includes a head, a bolt body, and a nut.
- the tab is located between the head and the projection and at least a portion of the projection is located between the nut and the tab.
- the second connection aperture defines internal threads.
- the projection defines a leg extending perpendicular to the axis and a boot at least partially extending along the axis.
- the boot abuts the tab.
- the connector includes the rivet, the rivet extending through the first and second connection apertures and at least partially abutting the projection and the tab.
- the connector includes the welded plastic piece formed of a plastic material and forming a weld bond with the projection and the tab.

According to a second aspect of the present disclosure, a stator carrier that extends along an axis between a first side and a second side and defines an opening. A tab is located on one of the first side or the second side, the tab defines a first connection aperture. A plurality of windings are located in the opening and at least one bus bar is in conductive communication with the plurality of windings. A bus bar carrier includes a body that supports the at least one bus bar. The body includes a projection extending towards the tab that defines a second connection aperture. A connector extends through the first and second connection apertures to attach the projection to the tab.

Embodiments of the second aspect of the disclosure can include any one or a combination of the following features:

- the connector is selected from a group comprising a rivet, a bolt, or a welded plastic piece.
- at least one of the first and second connection apertures defines internal threads.
- the stator carrier extends about the axis circumferentially.
- the tab extends about the axis circumferentially.
- the tab is formed of a metal material and the projection is formed of a plastic material.
- the at least one bus bar includes a plurality of bus bars supported by the bus bar carrier.
- the tab is integral with the stator carrier.

According to a third aspect of the present disclosure, a stator assembly for an electric motor includes a stator carrier that extends along an axis between a first side and a second side and defines an opening. A plurality of tabs are located on one of the first side or the second side, the plurality of tabs each defines a first connection aperture. A plurality of windings are located in the opening and at least one bus bar is in conductive communication with the plurality of windings. A bus bar carrier includes a body that supports the at least one bus bar. The body includes a plurality of projections that each define a second connection aperture, the plurality of projections extend towards and are aligned with the plurality of tabs. A plurality of connectors with each connector extending through the first and second connection apertures to attach the plurality of projections to the plurality of the tabs.

Embodiments of the third aspect of the disclosure can include any one or a combination of the following features:

- the plurality of connectors are selected from a group comprising a rivet, a bolt, or a welded plastic piece.
- the body of the bus bar carrier extends between a first end and a second end, at least one of the plurality of projections are proximate the first end and at least one of the plurality of projections are proximate the second end.

These and other features, advantages, and objects of the present disclosure will be further understood and appreciated by those skilled in the art by reference to the following specification, claims, and appended drawings.

Figure 1:
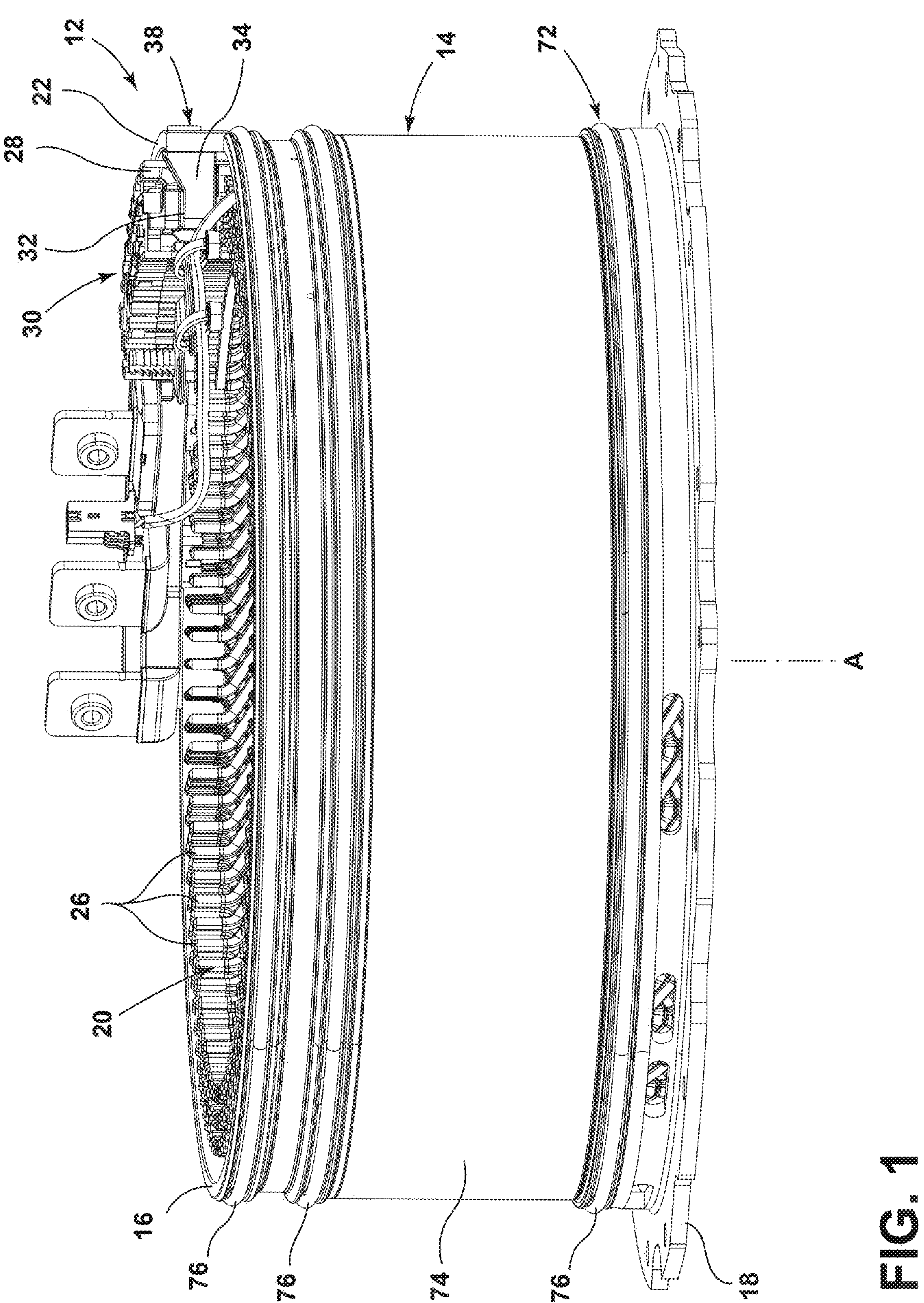
FIG. 1 is a side view of a stator assembly with a stator carrier and a bus bar carrier connected to the stator carrier.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis.

As used herein, the term "plurality" shall be understood to refer to two or more. The term "connector" shall be understood to refer to a member that is configured to couple a bus bar carrier to a stator carrier, such as a stator carrier in an electric motor.

Figure 2:
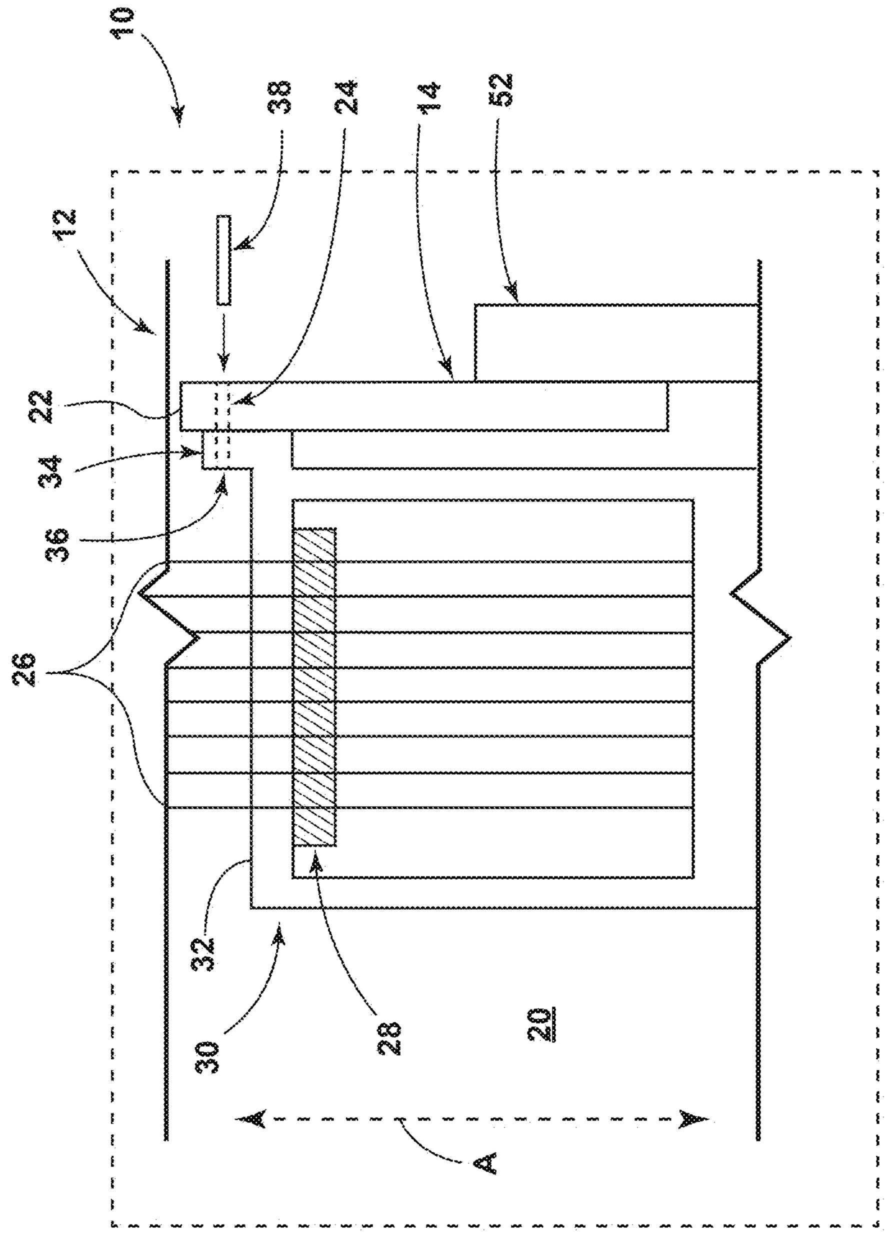
FIG. 2 is a schematic side view of an electric motor having a stator assembly with a stator carrier and a bus bar carrier connected to the stator carrier.
Figure 3:
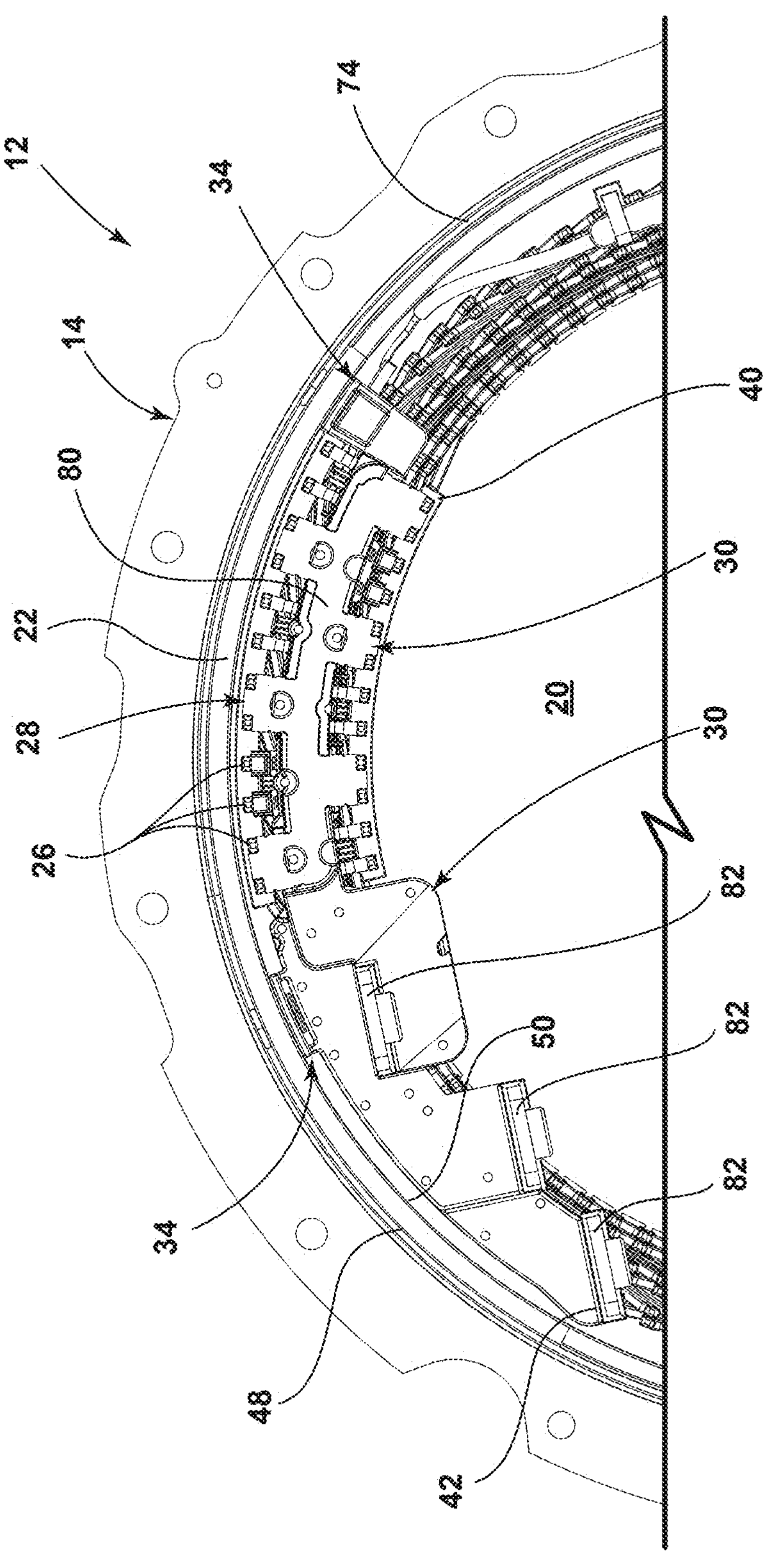
FIG. 3 is a top view of a stator assembly with a stator carrier and a bus bar carrier connected to the stator carrier.

Referring now to FIGS. 1-3, reference numeral 10 generally designates an electric motor 10. The electric motor 10 includes a stator assembly 12 having a stator carrier 14 that extends along an axis A between a first side 16 and a second side 18 and defines an opening 20. A tab 22 is located on one of the first side 16 or the second side 18, the tab 22 defines a first connection aperture 24. A plurality of windings 26 are located in the opening 20 and at least one bus bar 28 is in conductive communication with the plurality of windings 26. A bus bar carrier 30 includes a body 32 that supports the at least one bus bar 28. The body 32 includes a projection 34 extending towards the tab 22 that defines a second connection aperture 36. A connector 38 extends through the first and second connection apertures 24, 36 to attach the projection 34 to the tab 22. The connector 38 may be selected from a group comprising a rivet, a bolt, or a welded plastic piece.

With continued reference to FIGS. 1-3, in some embodiments the stator carrier 14 may be connected to a plurality of bus bar carriers 30, with each bus bar carrier 30 having a projection 34. More particularly, the stator carrier 14 may include a plurality of tabs 22 or a single tab 22 connected to different ones of the bus bar carriers 30. In some embodiments, each bus car carrier 30 may include a plurality (e.g., two or more, three or more, etc.) of projections 34 that extend towards and align with (e.g., and abut) one or more of the plurality of tabs 22 and are secured with one or more connectors 38. The body 32 of the bus bar carrier 30 may extend between a first end 40 and a second end 42 and at least one of the plurality of projections 34 may be proximate the first end 40 and at least one of the plurality of projections 34 may be proximate the second end 42. In some embodiments, at least one of the plurality of projections 34 is located between the first end 40 and the second end 42. For example, one of the plurality of projections 34 may be located substantially centrally between the first end 40 and the second end 42. The bus bar carrier 30 may be shaped to support multiple bus bars 28.

With reference now to FIG. 3, the stator carrier 14 may extend about the axis A circumferentially and define a circumference around the axis A. The bus bar carrier 30 or carriers 30 may likewise, extend around the axis A circumferentially. In some embodiments, the tabs 22 may also extend around the axis A circumferentially. The projections 34 may each define a leg 44 extending perpendicular to the axis A and a boot 46 at least partially extending along the axis A. The boot 46 defines the second connection aperture 36 and includes an exterior surface 48 that faces the tab 22. The tab 22 may include an interior surface 50 that faces the exterior surface 48 of the boot 46. The exterior and interior surfaces 48, 50 may define contours that are substantially matched. For example, the exterior and interior surfaces 48, 50 may flat, curved relative to the axis A, or other shapes. In some embodiments, the boot 46 (e.g., the exterior surface 48) may abut the tab 22 (e.g., the interior surface 50). In other embodiments, an intermediate structure, such as a nut may be located between and space the exterior and interior surfaces 48, 50.

In some embodiments, the tab 22 is formed of a metal material (e.g., aluminum, steel, etc.) and the projection 34 is formed of a plastic material. For example, the bus bar carrier 30 may be formed of the plastic material and the stator carrier 14 is formed of the metal material and integral with the tab 22. The stator assembly 12 depicted in FIGS. 1-3 is for the electric motor 10. The electric motor 10 may include a motor housing 52 exterior to and coupled with the stator carrier 14. The motor housing 52 may likewise be formed of the metal material (e.g., aluminum, steel, etc.).

Figure 4A:
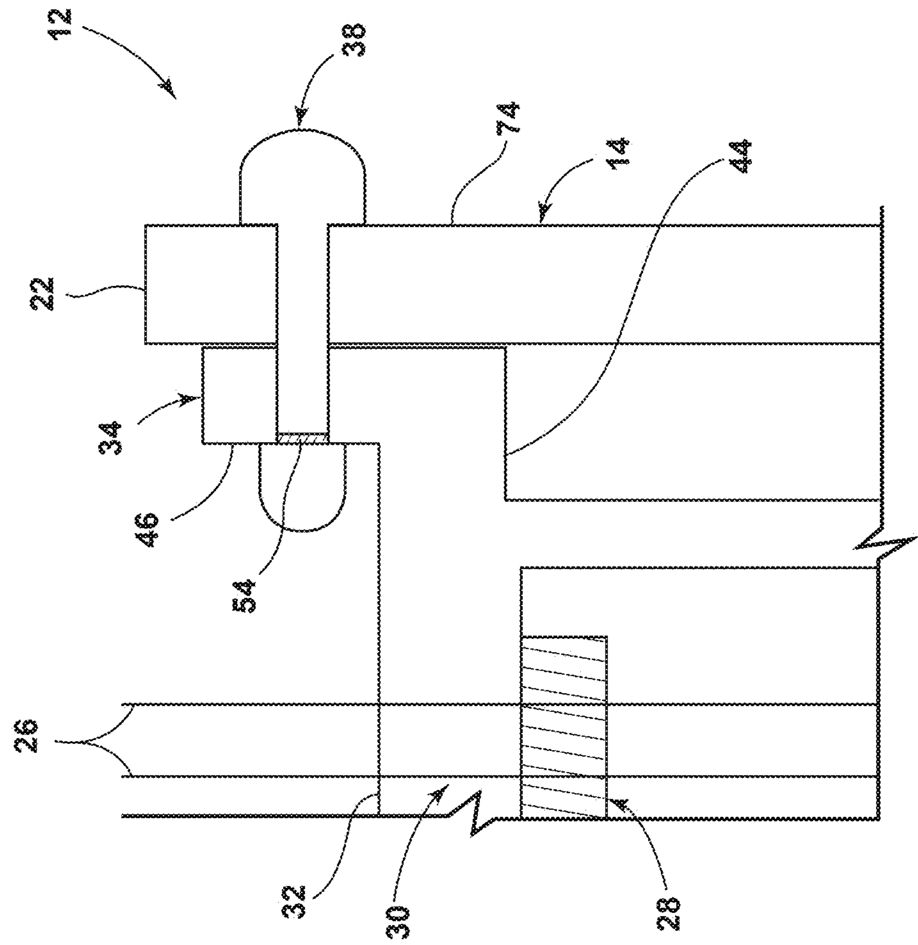
FIG. 4A is a cross-sectional view of a stator carrier and a bus bar carrier connected to the stator carrier with a connector that includes a welded plastic piece.
Figure 4B:
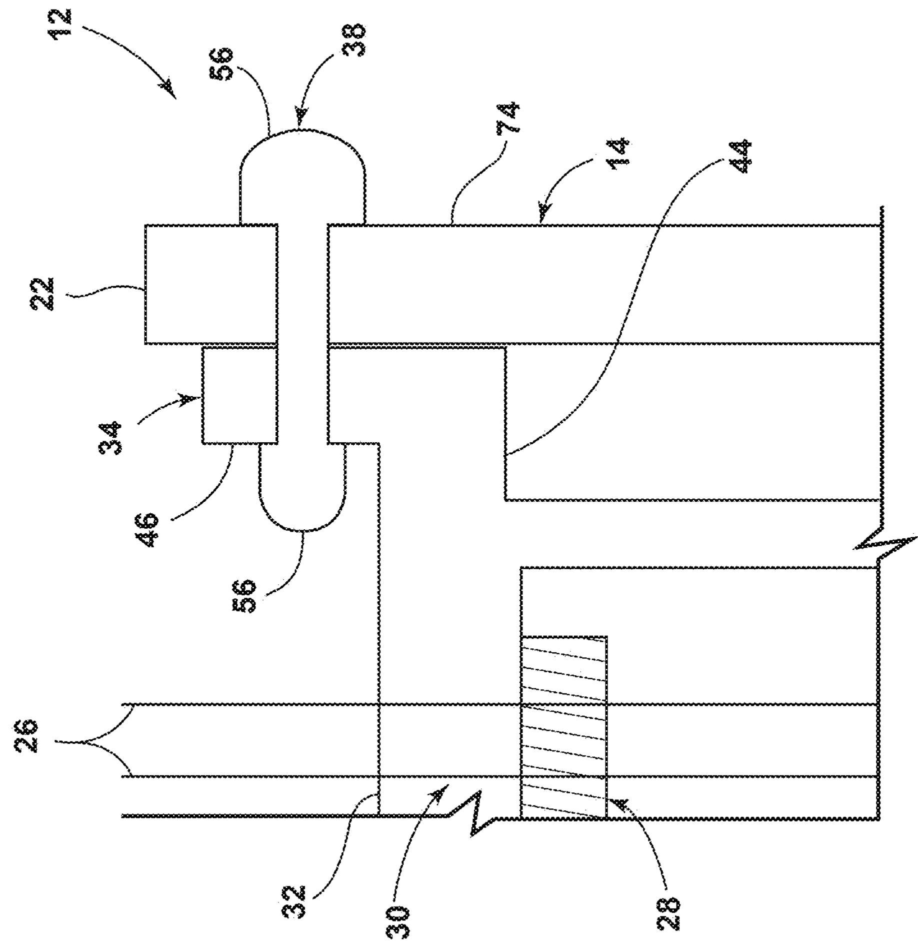
FIG. 4B is a cross-sectional view of a stator carrier and a bus bar carrier connected to the stator carrier with a connector that includes a rivet.
Figure 4C:
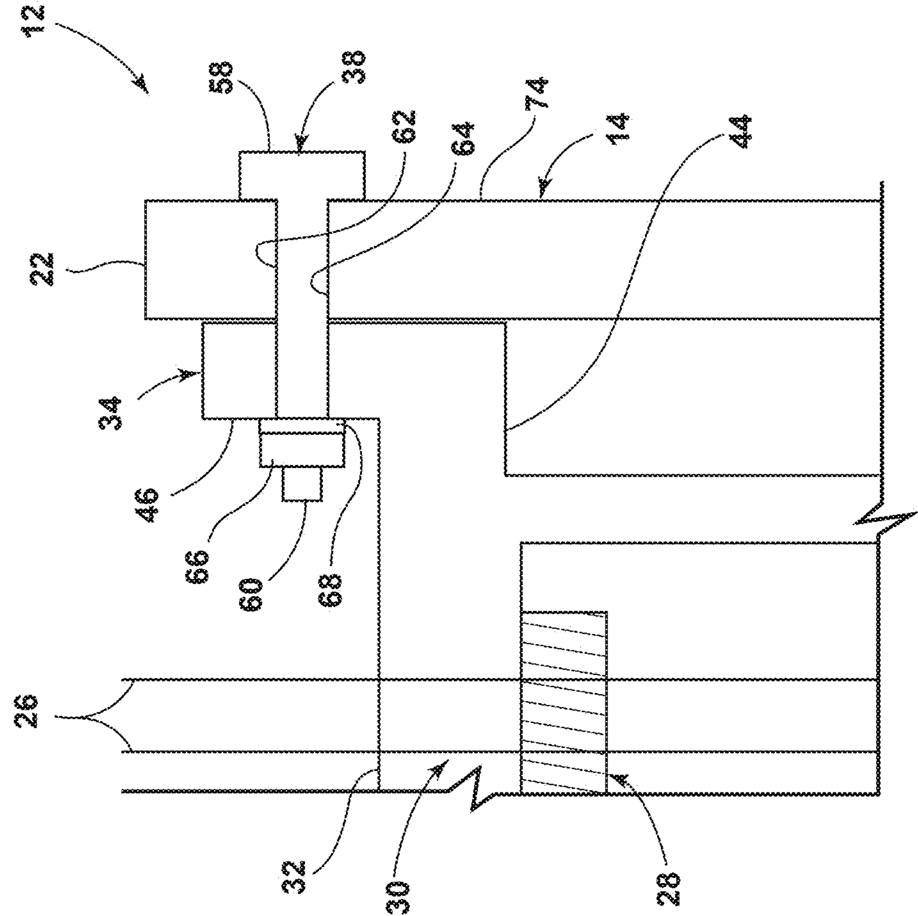
FIG. 4C is a cross-sectional view of a stator carrier and a bus bar carrier connected to the stator carrier with a connector that includes a bolt.

With reference now to FIGS. 4A-4C, the connector 38 may be selected from a group comprising the rivet, the bolt, or the welded plastic piece. As depicted in FIG. 4A, the connector 38 may include the welded plastic piece. More particularly, the welded plastic piece is formed of a plastic material and forms a weld bond 54 with the projection 34 and the tab 22. The welded plastic piece may be initially two or more plastic pieces with a portion inserted into the first and second connection apertures 24, 36 and welded and/or otherwise melted together to form the weld bond 54.

As depicted in FIG. 4B, the connector 38 may include the rivet. More particularly, the rivet may be formed of a plastic or metal material and extend through the first and second connection apertures 24, 36. The rivet may include opposing enlarged portions 56 that at least partially abut the projection 34 and the tab 22 and a mandrel portion that extends through the first and second connection apertures 24, 36. In this manner, the projection 34 and the tab 22 may be sandwiched between the enlarged portions 56.

As depicted in FIG. 4C, the connector 38 may include the bolt. More particularly, the bolt may include a head 58 and a bolt body 60. The bolt body 60 may define exterior threads 62. In some embodiments, the head 58 and the bolt body 60 may be formed of a metal material. In some embodiments, at least one of the first and second connection apertures 24, 36 defines internal threads 64 matched with the exterior threads 62. The connector 38 (e.g., the bolt) may further include a nut 66 connected to the exterior threads 62, such that the projection 34 and the tab 22 are sandwiched between the head 58 and the nut 66. In some embodiments, the tab 22 is located between the head 58 and the projection 34 and at least a portion of the projection 34 is located between the nut 66 and the tab 22. In other embodiments, at least a portion of the projection 34 is located between the head 58 and the tab 22 and the tab 22 is located between the nut 66 and at least a portion of the projection 34. In some embodiments, one or more washers 68 may be utilized to facilitate connection between the projection 34 and the tab 22. Further, it is contemplated that, in some embodiments, the connector 38 (e.g., the bolt) may not utilize the nut 66. It should be appreciated that, in some embodiments, a variety (e.g., two or more) of the connectors 38 in FIGS. 4A-4C may be utilized.

Figure 5:
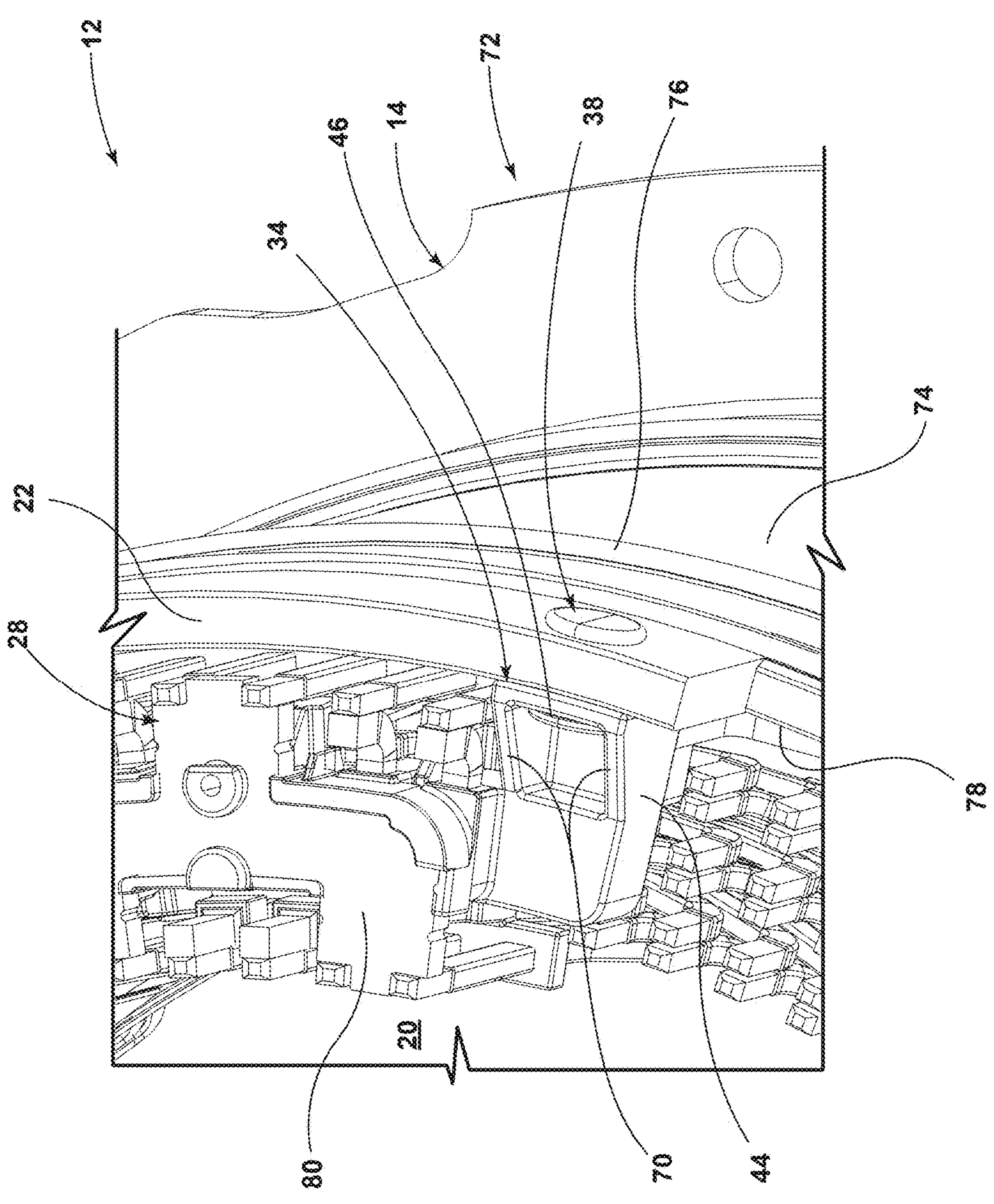
FIG. 5 is an enlarged top perspective view of a stator carrier with a bus bar carrier connected to the stator carrier.
Figure 6:
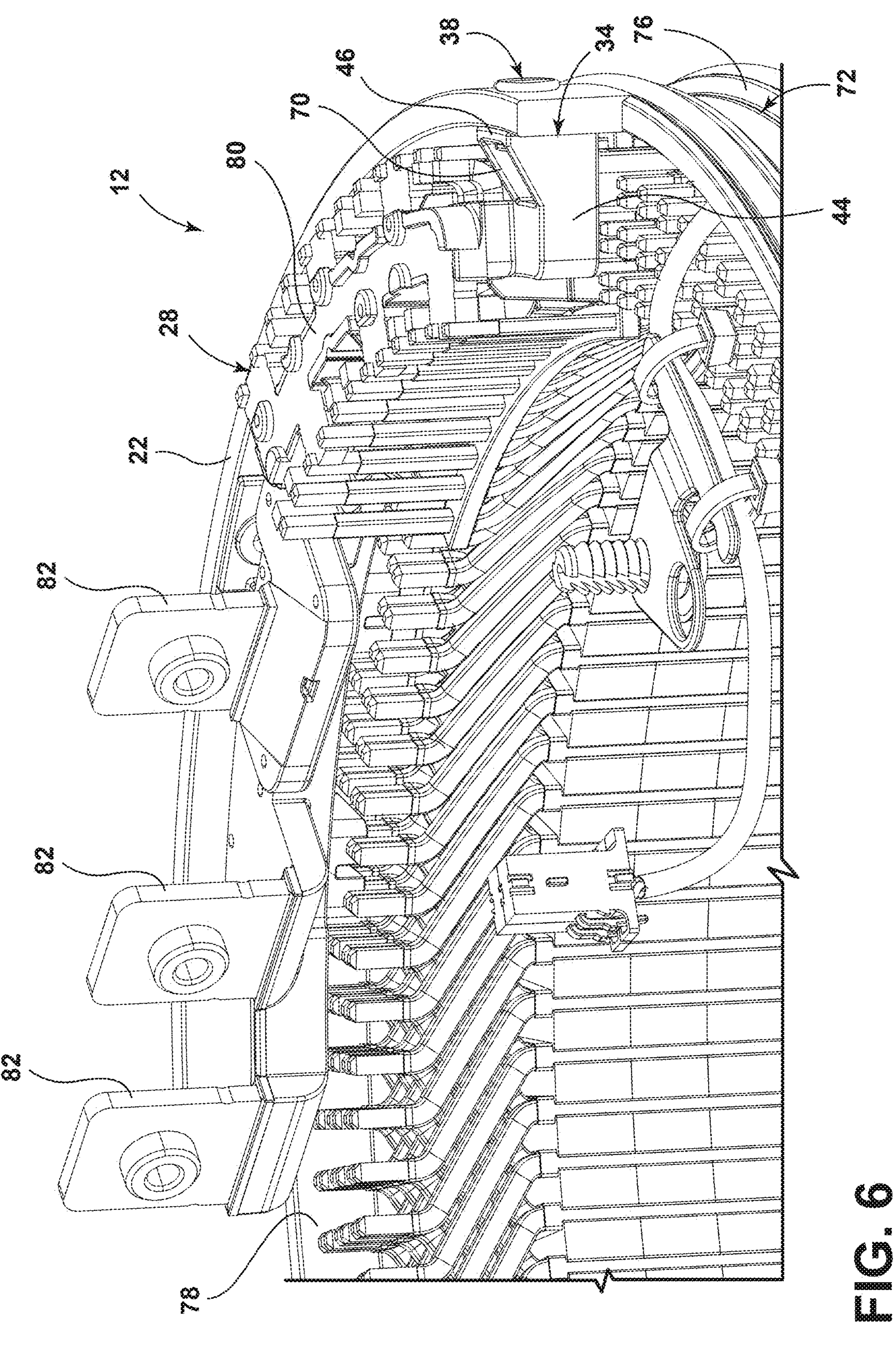
FIG. 6 is a top perspective view of a stator carrier with a bus bar carrier supporting a plurality of bus bars.

With reference now to FIGS. 5 and 6, the bus bar carrier 30 may have a multi-piece or single-piece construction. The leg 44 of the projection 34 may include one or more supporting ribs 70. The ribs 70 may widen towards the boot 46. In some embodiments, the boot 46 may be plate-shaped. The boot 46 may extend along the axis A a greater distance than the leg 44 and ribs 70 or, alternatively, the leg 44 and the ribs 70 may merge into and be axially flush with top and bottom surfaces of the boot 46. The stator carrier 14 may include one or more channels 72 defined on an exterior carrier surface 74 and a gasket 76 may be located in each channel 72. The stator carrier 14 may further define an interior carrier surface 78 defining the opening 20. The stator carrier 14 defines a thickness between the exterior carrier surface 74 and the interior carrier surface 78. In some embodiments, the tabs 22 have a thickness that is less than the thickness of the stator carrier 14. For example, the tabs 22 may be flush with the exterior carrier surface 74 and spaced from the interior carrier surface 78, flush with the interior carrier surface 78 and spaced from the exterior carrier surface 74, or spaced from both the exterior carrier surface 74 and the interior carrier surface 78 (e.g., centrally). However, it should be appreciated that, in some embodiments, the tabs 22 have a thickness that is equal to the thickness of the stator carrier 14.

With continued reference to FIGS. 5 and 6, the projection 34 (e.g., the leg 44 and the boot 46) may be integrally formed (e.g., molded) with the bus bar carrier 30. The bus bar carrier 30 may define multiple holes that the windings 26 can be inserted into. The bus bars 28 may include a main body portion 80 and bus tabs 82 extending into conductive communication with select windings 26. In some embodiments, each of the plurality of bus bars 28 is in conductive communication with different ones of the windings 26. It should be appreciated that, unless explicitly stated, the electric motor 10 may be incorporated into any structure (e.g., an electric axle or other components of a vehicle) and/or utilized for any function where it is beneficial to reduce relative movement (e.g., vibration) and/or secure the connection between the stator carrier 14 and/or the bus bar carrier 30 and the motor housing 52.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

A axis
10 electric motor
12 stator assembly
14 stator carrier
16 first side
18 second side
20 opening
22 tab
24 first connection aperture
26 windings
28 bus bar
30 bus bar carrier
32 body
34 projection
36 second connection aperture
38 connector
40 first end
42 second end
44 leg
46 boot
48 exterior surface
50 interior surface
52 motor housing
54 welded bond
56 enlarged portions
58 head
60 bolt body
62 exterior threads
64 internal threads
66 nut
68 washer
70 rib
72 channel
74 exterior carrier surface
76 gasket
78 interior carrier surface
80 main body portion
82 bus tabs

What is claimed is:

1. A stator assembly for an electric motor, comprising:

a stator carrier extending along an axis between a first side and a second side and defining an opening, a tab located on one of the first side or the second side, the tab defining a first connection aperture;

a plurality of windings located in the opening and at least one bus bar in conductive communication with the plurality of windings;

a bus bar carrier including a body that supports the at least one bus bar, the body includes a projection extending towards the tab that defines a second connection aperture; and a connector extending through the first and second connection apertures to attach the projection to the tab, the connector is selected from a group comprising a rivet, a bolt, or a welded plastic piece.

2. The stator assembly of claim 1, wherein the first connection aperture defines internal threads and the connector includes the bolt.

3. The stator assembly of claim 2, wherein the bolt includes a head, a bolt body, and a nut.

4. The stator assembly of claim 3, wherein the tab is located between the head and the projection and at least a portion of the projection is located between the nut and the tab.

5. The stator assembly of claim 1, wherein the second connection aperture defines internal threads.

6. The stator assembly of claim 1, wherein the projection defines a leg extending perpendicular to the axis and a boot at least partially extending along the axis.

7. The stator assembly of claim 6, wherein the boot abuts the tab.

8. The stator assembly of claim 1, wherein the connector includes the rivet, the rivet extending through the first and second connection apertures and at least partially abutting the projection and the tab.

9. The stator assembly of claim 1, wherein the connector includes the welded plastic piece formed of a plastic material and forming a weld bond with the projection and the tab.

10. A stator assembly for an electric motor, comprising:

a stator carrier extending along an axis between a first side and a second side and defining an opening, a tab located on one of the first side or the second side, the tab defining a first connection aperture;

a plurality of windings located in the opening and at least one bus bar in conductive communication with the plurality of windings;

a bus bar carrier including a body that supports the at least one bus bar, the body includes a projection extending towards the tab that defines a second connection aperture; and a connector extending through the first and second connection apertures to attach the projection to the tab.

11. The stator assembly of claim 10, wherein the connector is selected from a group comprising a rivet, a bolt, or a welded plastic piece.

12. The stator assembly of claim 10, wherein at least one of the first and second connection apertures defines internal threads.

13. The stator assembly of claim 10, wherein the stator carrier extends about the axis circumferentially.

14. The stator assembly of claim 13, wherein the tab extends about the axis circumferentially.

15. The stator assembly of claim 10, wherein the tab is formed of a metal material and the projection is formed of a plastic material.

16. The stator assembly of claim 10, wherein the at least one bus bar includes a plurality of bus bars supported by the bus bar carrier.

17. The stator assembly of claim 10, wherein the tab is integral with the stator carrier.

18. A stator assembly for an electric motor, comprising:

a stator carrier extending along an axis between a first side and a second side and defining an opening, a plurality of tabs located on one of the first side or the second side, the plurality of tabs each defining a first connection aperture;

a plurality of windings located in the opening and at least one bus bar in conductive communication with the plurality of windings;

a bus bar carrier including a body that supports the at least one bus bar, the body includes a plurality of projections that each define a second connection aperture, the plurality of projections extending towards and aligned with the plurality of tabs; and a plurality of connectors, each connector extending through the first and second connection apertures to attach the plurality of projections to the plurality of the tabs.

19. The stator assembly of claim 18, wherein the plurality of connectors are selected from a group comprising a rivet, a bolt, or a welded plastic piece.

20. The stator assembly of claim 18, wherein the body of the bus bar carrier extends between a first end and a second end, at least one of the plurality of projections are proximate the first end and at least one of the plurality of projections are proximate the second end.

* * * * *